United States Patent
Häfele et al.

(10) Patent No.: US 12,433,726 B2
(45) Date of Patent: Oct. 7, 2025

(54) METHOD FOR PRODUCING A DENTAL OBJECT

(71) Applicant: Ivoclar Vivadent AG, Schaan (LI)

(72) Inventors: Clemens Andreas Häfele, Feldkirch (AT); Christoph Haydl, Rheineck (CH); Pascal Scherrer, Chur (CH); Rebecca Russ, Dafins (AT)

(73) Assignee: Ivoclar Vivadent AG, Schaan (LI)

( * ) Notice: Subject to any disclaimer, the term of this patent is extended or adjusted under 35 U.S.C. 154(b) by 361 days.

(21) Appl. No.: 17/938,744

(22) Filed: Oct. 7, 2022

(65) Prior Publication Data

US 2023/0114202 A1    Apr. 13, 2023

(30) Foreign Application Priority Data

Oct. 7, 2021 (EP) .................... 21201443

(51) Int. Cl.
  *A61C 13/01*  (2006.01)
  *A61C 13/00*  (2006.01)
  *A61C 13/36*  (2006.01)

(52) U.S. Cl.
  CPC ......... *A61C 13/01* (2013.01); *A61C 13/0019* (2013.01); *A61C 13/1016* (2013.01)

(58) Field of Classification Search
  CPC .. A61C 13/0019; A61C 13/01; A61C 13/1016
  See application file for complete search history.

(56) References Cited

U.S. PATENT DOCUMENTS

| | | |
|---|---|---|
| 10,514,875 B2 | 12/2019 | De Groot et al. |
| 10,950,826 B2 | 3/2021 | Harjee et al. |
| 11,233,266 B2 | 1/2022 | Takahashi et al. |
| 2006/0186101 A1 | 8/2006 | Hagemeister et al. |
| 2018/0153661 A1 | 6/2018 | Beeby et al. |
| 2019/0247169 A1 | 8/2019 | Fisker |
| 2020/0316856 A1 | 10/2020 | Mojdeh et al. |
| 2021/0228316 A1 | 7/2021 | Korten et al. |
| 2023/0009985 A1 | 1/2023 | Cinader, Jr. et al. |

FOREIGN PATENT DOCUMENTS

DE    102017113814 A1    12/2018

*Primary Examiner* — James Sanders
(74) *Attorney, Agent, or Firm* — Ann M. Knab; Thad McMurray

(57) ABSTRACT

The present invention relates to a method of producing a dental object (100), comprising the step of producing a support structure (101) on the dental object (100) having a predetermined breaking point (103) arranged such that a residual portion (105) of the support structure (101) remains on the dental object (100) after the predetermined breaking point (103) is separated.

8 Claims, 2 Drawing Sheets

METHOD FOR PRODUCING A DENTAL OBJECT

CROSS-REFERENCE TO RELATED APPLICATIONS

This application claims priority to European patent application No. 21201443.5 filed on Oct. 7, 2021, which disclosure is incorporated herein by reference in its entirety.

TECHNICAL FIELD

The present invention relates to a method of producing a dental object and a dental object having a support structure.

BACKGROUND

The removal of support structures from dental objects is often laborious and difficult to automate. Removal can lead to material chipping and other problems. In addition, the removal of support structures requires time, as it is a manual activity that is difficult to automate. Because of the risk of material damage due to heat or excessive removal, the removal of support structures must be performed precisely.

U.S. Pat. Nos. 10,950,826, 11,233,266, 10,514,875, 20060186101, 20190247169 and 20180153661 are directed to additive manufacturing techniques and are hereby incorporated by reference in their entirety.

SUMMARY

It is the technical aim of the present invention to provide a dental object having a support structure that can be easily removed.

This technical problem is solved by subject-matter according to the independent claims. Technically advantageous embodiments are the subject of the dependent claims, the description and the drawings.

According to a first aspect, the technical problem is solved by a method for producing a dental object, comprising the step of creating a support structure on the dental object with a predetermined breaking point arranged such that after separation of the predetermined breaking point a residual portion of the support structure remains on the dental object. This achieves, for example, the technical advantage that manual activities are reduced, and the process attractiveness is increased. The dental object is prevented from damage since no milling of protrusions is necessary. The residual portion can be used for subsequent stabilization of the dental object.

In a technically advantageous embodiment of the method, the predetermined breaking point is arranged at a predetermined distance from the dental object. This achieves, for example, the technical advantage that the residual portion on the dental object has a predetermined length.

In a further technically advantageous embodiment of the method, the support structure tapers towards the predetermined breaking point. The taper of the support structure may be from both sides of the support structure towards the predetermined breaking point, or only from one side. This provides, for example, the technical advantage that the residual portion can be easily inserted into an opposing recess.

In a further technically advantageous embodiment of the method, a predetermined residual amount of the support structure remains on the dental object after the predetermined breaking point has been separated. This achieves, for example, the technical advantage that sufficient stability of the residual portion can be ensured.

In a further technically advantageous embodiment of the method, the support structure with the predetermined breaking point is automatically planned by an algorithm. The predetermined breaking points can, for example, be integrated into a CAM data set by the algorithm. This achieves, for example, the technical advantage of reducing the effort required to produce the dental object.

In a further technically advantageous embodiment of the method, the dental object and/or the support structure are produced by a 3D printing process. This achieves, for example, the technical advantage that the dental object and the support structure can be produced in a simple manner.

In a further technically advantageous embodiment of the method, the dental object is attached to a further dental object. This has the technical advantage, for example, that a firm bond is achieved between the two dental objects.

In a further technically advantageous embodiment of the method, the residual portion of the support structure is fully or partially inserted into a recess of the further dental object. In this way, an adhesive gap may be generated between the dental objects. The adhesive gap may have a distance between the dental objects of 50 µm. This has the technical advantage, for example, of creating a form fit between the dental objects and improving the stability of the connection.

In a further technically advantageous embodiment of the method, the residual portion generates an adhesive gap between the dental objects. The adhesive gap is generated, for example, by the one or more residual portions having a length smaller or larger than the depth of the recesses. When the residual portions have a length greater than the depth of the corresponding recesses, the adhesive gap is formed outside the recesses. If the residual portions have a smaller length than the depth of the corresponding recesses, the adhesive gap is formed inside the recesses. In this case, the residual portions do not fully ingress into the recesses. This is preferred when the printed dental objects are assembled.

In this way, a gap or distance can be generated between the dental objects into which an adhesive can flow. This provides the technical advantage, for example, of increasing the strength of an adhesive bond.

In a further technically advantageous embodiment of the method, the dental object is a dental arch and the further dental object is a denture base. This provides, for example, the technical advantage that a dental arch can be fixedly attached to a denture base.

According to a second aspect, the technical problem is solved by a dental object with a support structure comprising a predetermined breaking point arranged in such that a residual portion of the support structure remains on the dental object after separation of the predetermined breaking point. The dental object achieves the same technical advantages as the method according to the first aspect.

In a technically advantageous embodiment of the dental object, the predetermined breaking point is arranged at a predetermined distance from the dental object. This also achieves, for example, the technical advantage that the residual portion on the dental object has a predetermined length.

In a further technically advantageous embodiment of the dental object, the support structure tapers towards the predetermined breaking point. This also achieves, for example, the technical advantage that the residual portion can be easily inserted into an opposite recess.

In a further technically advantageous embodiment of the dental object, the dental object is a dental arch. This provides, for example, the technical advantage of creating a dental arch that can be fixedly attached to a denture base.

According to a third aspect, the technical problem is solved by a dental object system comprising a dental object according to the second aspect, which is attached to a further dental object. The dental object system achieves the same technical advantages as the method according to the first aspect.

BRIEF DESCRIPTION OF THE DRAWINGS

Examples of embodiments of the invention are shown in the drawings and will be described in more detail below.

DETAILED DESCRIPTION

Figure 1:
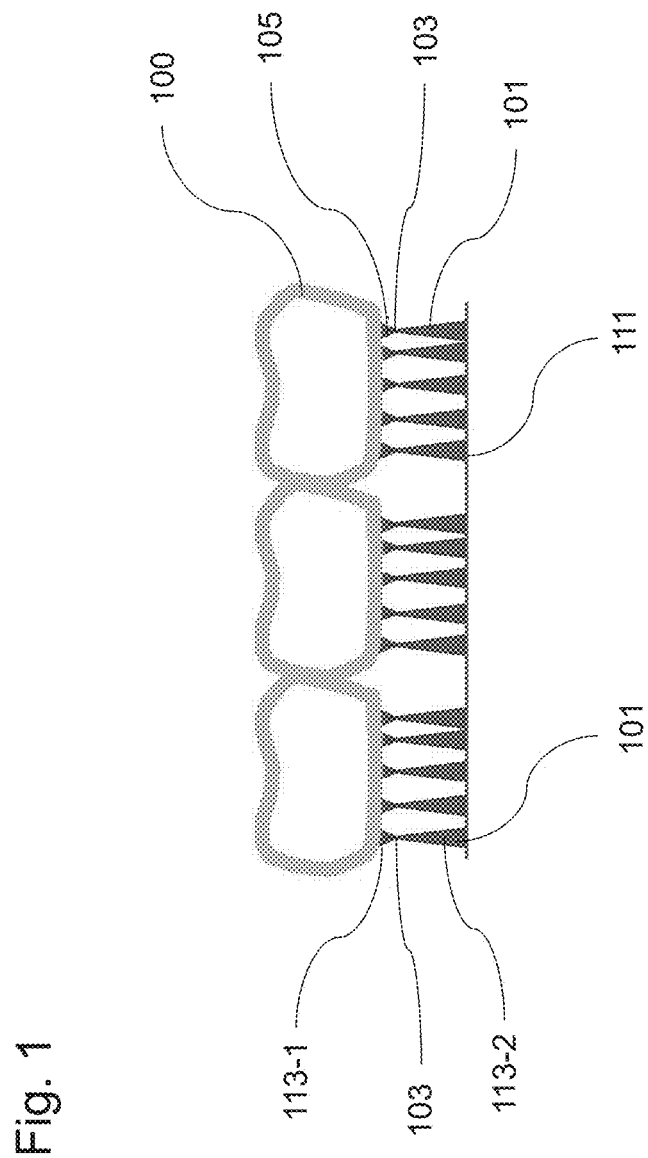
FIG. 1 shows a schematic representation of a dental object with support structures.

FIG. 1 shows a schematic representation of a dental object 100 with support structures 101. The dental object 100 is, for example, an artificially produced dental arch or tooth. The dental object 100 may be produced, for example, using a 3D printing process. In a 3D printing process, the dental object 100 is built up layer by layer in the desired shape. The dental object 100 and the support structures 101 may be made of, for example, a ceramic, a glass ceramic, an oxide ceramic, a metal ceramic, cross-linked or non-cross-linked plastics, composite material, a metal.

During production of the dental object 100, a plurality of rod- or column-shaped support structures 101 are generated to extend in a bridge-like manner between the dental object 100 and a base surface 111. The support structures 101 mechanically support the dental object 100 relative to the base surface 111. The support structures 101 have, for example, a length of 2 to 100 mm, a width of 1 to 2 mm, and a spacing of 0.3 to 1 mm, 1 to 3 mm, 4 to 8 mm, or 8 to 12 mm.

A predetermined breaking point 103 is integrated and arranged in the support structures 101. The predetermined breaking point 103 allows the respective support structure 101 to be separated by the action of a mechanical force at the predetermined breaking point 103. The predetermined breaking point 103 is arranged at a predetermined distance from the dental object 100.

The predetermined breaking point 103 is configured such that a defined residual amount of the support structure 101 remains on the dental object 100 as a residual portion 105 after breaking. The residual portion 105 protrudes from the underside of the dental object 100. For example, the residual portion 105 may have a conical shape. In general, however, other shapes are also possible. The support structures 101 with the predetermined breaking points 103 can be produced together with the dental object 100 in the 3D printing process.

The predetermined breaking point 103 is formed, for example, by two sections 113-1 and 113-2 of the support structure 101 tapering towards each other. The predetermined breaking point 103 is formed at the point with the smallest cross-section. The predetermined breaking point 103 may also be formed on one side by a conical section of the support structure 101. In general, however, support structures 101 with other geometries are also possible, such as cylindrical, convex or concave tapered or pyramidal.

When the residual portion 105 widens towards the dental object 100, the technical advantage arises that it can be inserted into a corresponding recess in a simple and self-centering manner. In addition, the residual portions 105 generate the technical advantage of increasing the surface area so that an inserted adhesive is distributed over a larger area and greater adhesion during bonding is made possible.

For example, the support structures 101 with the predetermined breaking points 103 can be automatically calculated and planned by a user on a computer as part of a CAD/CAM process when designing the dental object 100. In this regard, the number and shape of the support structures 101 may be automatically determined by the computer and specified to the user. The same applies to the predetermined breaking points 103, the arrangement of which within the support structures 101 can also be calculated automatically. For this purpose, an algorithm may be used that independently learns the positions from a number of examples of the dental object 100. When defining the positioning of the support structures 101, the installation of the predetermined breaking point 103 can then be performed automatically.

Figure 2:
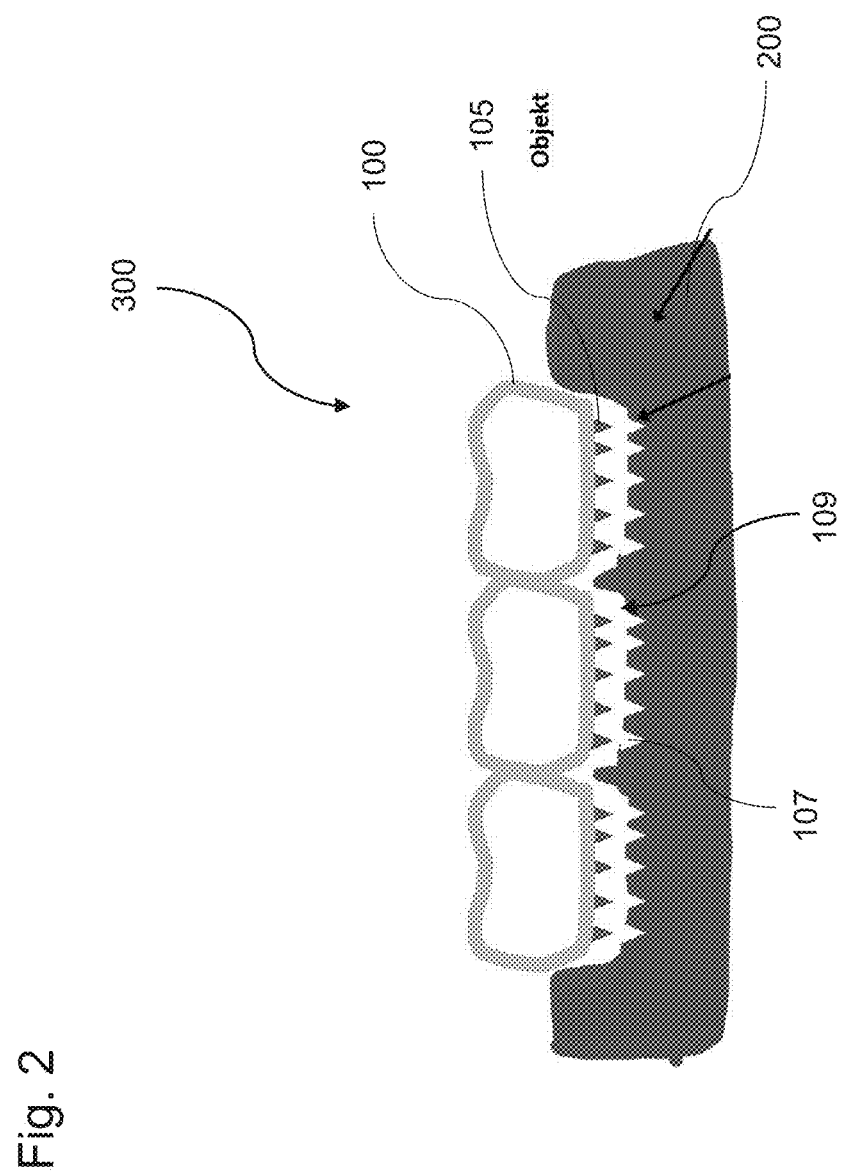
FIG. 2 shows a schematic representation of a dental object system with two dental objects.

FIG. 2 shows a schematic diagram of a dental object system 300 with two dental objects 100 and 200. The dental object 100 is a dental arch that has been produced using a 3D printing process. The support structures 101 have been separated at the predetermined breaking points 103, so that these remain as residual portions 105 on the dental arch.

The dental object 100 is inserted into another dental object 200, such as a denture base. The dental object 200 includes tapered recesses 107 corresponding to the residual portions 105 on the dental object 100. However, in general, the recesses 107 may have a different geometry as long as the residual portions 105 can be inserted therein. These are arranged at positions corresponding to the positions of the opposing residual portions 105.

When inserting the dental object 100, a substantial form fit can be achieved between protruding residual portions 105 and the recesses 107. The outwardly decreasing width of the residual portions 105 may facilitate insertion of one dental object 100 into the other dental object 200.

The increase in surface area provided by the residual portions 105 may improve the bond between the two dental objects 100 and 200. However, it is also possible that positioning may be simplified or improved by the key-lock principle resulting from the residual portions 105 and the recesses 107. The residual portions 105 of the support structures 101 do not necessarily have to be removed.

However, the residual portions 105 and the recesses 107 may also be dimensioned such that an adhesive gap 109 remains between the dental objects 100 and 200 after insertion of the dental object 100. In this case, the residual portions 105 have, for example, a length greater than the depth of the recesses 107. From this adhesive gap 109, which is ideally formed in a bonding surface for bonding, a free space is generated between the dental objects 100 and 200 from which a used adhesive is not displaced.

Particularly in the field of complete dentures, when bonding a dental arch to a denture base, a defined bonding gap 109 can be generated as part of the design. The residual portions 105 can form this gap dimension after insertion into the recesses 107. In reducing the gap size, advantages arise when using a low viscosity adhesive or bonding untempered dental objects 100 with resin from the construction process or by bonding the inhibited surfaces.

The support structures 101 may also not generate an adhesive gap 109 having a greater length compared to the recesses 107. In this case, the residual portions 105 are received in the recesses 107 and allow for an adhesive gap 109 due to the substantial form fit without spacers.

Alternatively, it is conceivable that the remaining residual portions 105 fully or partially engage the recesses 107 to form a minimal adhesive gap. For example, if the bonding of the dental objects 100 and 200 is performed only on the basis of the inhibited surfaces, cavities can thus be formed between the residual portions 105 and recesses 107.

In reducing the gap size of the bonding gap 109, advantages are gained by using a low viscosity adhesive or bonding untempered dental objects 100 with plastic from the construction process or by bonding the inhibited surfaces.

In this way, the separated support structures 101 can be used to form support structures or reinforcement structures for partial prosthetics. The concept is transferable to other fields of application outside the dental field.

All of the features explained and shown in connection with individual embodiments of the invention may be provided in various combinations in the subject matter of the invention to simultaneously realize their beneficial effects.

All method steps can be implemented by means suitable for executing the respective method step. All functions that are executed by the objective means can be a method step of a method.

The scope of protection of the present invention is given by the claims and is not limited by the features explained in the description or shown in the figures.

REFERENCE LIST

100 Dental object
101 Support structure
103 Predetermined breaking point
105 Residual portion
107 Recess
109 Adhesive gap
111 Floor space
200 Dental object
300 Dental object system

The invention claimed is:

1. A method of producing a dental object (100), comprising the step of:
producing a support structure (101) on the dental object (100) with a predetermined breaking point (103) which is arranged such that, after the predetermined breaking point (103) has been separated, a residual portion (105) of the support structure (101) remains on the dental object (100), and
wherein the dental object (100) is attached to a further dental object (200) and the residual portion (105) of the support structure (101) is fully or partially inserted into a recess (107) of the further dental object (200).

2. The method according to claim 1,
wherein the predetermined breaking point (103) is arranged at a predetermined distance from or on the dental object (100).

3. The method according to claim 1,
wherein the support structure (101) tapers towards the predetermined breaking point (103).

4. The method according to claim 1,
wherein a predetermined residual amount of the support structure (101) remains on the dental object (100) after separation of the predetermined breaking point (103).

5. The method according to claim 1,
wherein the support structure (101) with the predetermined breaking point (103) is automatically planned by an algorithm.

6. The method according to claim 1,
wherein the dental object (100) and/or the support structure (101) are produced by a 3D printing process.

7. The method according to claim 1,
wherein the residual portion (105) generates an adhesive gap (109) between the dental objects (100, 200).

8. The method according to claim 1,
wherein the dental object (100) is a dental arch and the further dental object (200) is a denture base.

* * * * *